Patented June 18, 1946

2,402,517

UNITED STATES PATENT OFFICE 2,402,517

HIGH DIELECTRIC MATERIAL AND METHOD OF MAKING SAME

Eugene Wainer, Niagara Falls, N. Y., assignor to The Titanium Alloy Manufacturing Company, New York, N. Y., a corporation of Maine No Drawing. Application November 2, 1943, Serial No. 508,745

7 Claims. (Cl. 106—46)

This invention relates to ceramic dielectric materials in which certain alkaline earth metal titanates are the predominating constituent ceramically reacted with alkaline earth zirconates.

In previous applications for patent, namely, Serial No. 482,613 filed April 10, 1943; Serial No. 489,382 filed June 2, 1943, now Patent No. 2,377,910 granted June 12, 1945; Serial No. 490,485 filed June 11, 1943, and Serial No. 377,851, filed February 7, 1941, now Patent No. 2,371,660 granted March 20, 1945, the useful properties of mixtures of alkaline earth titanates, of certain titanates and fluorides, of titanates and stannates and of titanium with certain metal oxides have been described and claimed. The present invention relates to another group of bodies whose usefulness is equally widespread. This novel group of ceramic compositions have properties such as to make them useful as capacitors in radio, television, and communications generally, as capacitative temperature compensating devices in receivers and communication equipment to prevent distortions due to changes in circuit characteristics caused by temperature changes. The dielectric constant of some of these compositions are such as to make possible their utilization in low frequency distribution and communication systems such as 60 cycle lines, by means of capacitative coupling between a low frequency high tension transmission line and communication telephone lines. Further, these high constants enable these materials to be used as substitutes for high capacity paper and electrolytic type condensers for by-pass, filter, and power circuits, for use in radio, fluorescent lighting circuits, etc.

The particular usefulness of this group as compensators for correction of frequency drift lies not only in the possibility of obtention of both positive and negative temperature coefficients of a wide variety but also the possibility of controlling the variation through choice of the proper composition. Furthermore, some of the temperature coefficients make members of the group useful as mica substitutes, particularly because of the low power factors available.

These novel compositions consists broadly of fired mixtures of the titanates of strontium and calcium with the zirconates of the alkaline earth metals including magnesium. The peculiarly beneficial effect of zirconate additions to barium titanate is described in co-pending application Serial No. 508,743, filed November 2, 1943, wherein the erratic behavior of the dielectric constant of barium titanate, at increasing temperatures, was corrected and radically changed. In accordance with the present invention, fired bodies of desired dielectric properties and having exceptionally desirable power factors are produced by combining the alkaline earth metal zirconates, including magnesium, with strontium or calcium titanate.

In the practice of the present invention, the ingredients as indicated in the table below are properly reacted ceramically and then ground so that the coarsest particles will pass a 325 mesh screen. The dried powders are then mixed within the limits indicated by the proportions given in the table. Approximately 10% water is added and thoroughly mixed in the damp powder, granulated by passage through a 20 mesh screen. They are then pressed in a die under a pressure of 5 to 10 tons per square inch, and then allowed to air dry for 24 hours. The pieces used for the purposes of this specification are roughly 1 inch in diameter and 0.1 inch thick. Pieces of such size are fired on a schedule of 400° F. per hour to the peak temperature, then held at peak temperature for three hours, and then allowed to cool. The maturation temperature for all the bodies listed below is between 2450° F. and 2500° F. After cooling the opposing parallel surfaces are painted with silver powder paste which is fixed as a silver electrode by firing to 1500° F.

The values obtained below were determined at one megacycle using a radio frequency bridge of standard design. Resistivity was determined on a high sensitivity resistance circuit on which a resistance of a million megohms could easily be detected, the zero point indicator being a galvanometer. The 1000 cycle measurements were obtained through use of an impedance bridge of standard design, whose arms were resistive components.

The data below indicate that not only may these groups of compositions be used for by-pass, filter, and power pack condensers as substitutes for paper and eelctrolytics but also as substitutes for mica both from standpoint of power factor and temperature coefficient. The possibility of variation and control of temperature coefficients is indicated from Table 2. These data were obtained at one megacycle.

Table 1

| No. | Titanate—zirconate | One megacycle | | One kilocycle | |
|---|---|---|---|---|---|
| | | Dielectric constant | Power factor per cent | Dielectric constant | Power factor per cent |
| 24 | 90 $SrTiO_3$+10 $MgZrO_3$ | 149 | 0.01 | 163 | 1.4 |
| 25 | 75 $SrTiO_3$+25 $MgZrO_3$ | 168 | 0.05 | 183 | 1.4 |
| 26 | 25 $SrTiO_3$+75 $MgZrO_3$ | 39 | 0.03 | 48 | 2.5 |
| 27 | 100 $SrTiO_3$+1 $BaZrO_3$ | 266 | 0.01 | 283 | 1.1 |
| 28 | 100 $SrTiO_3$+5 $BaZrO_3$ | 252 | 0.02 | 253 | 1.1 |
| 29 | 100 $SrTiO_3$+10 $BaZrO_3$ | 230 | 0.04 | 238 | 1.1 |
| 30 | 100 $CaTiO_3$+1 $BaZrO_3$ | 163 | 0.01 | 172 | 1.5 |
| 31 | 100 $CaTiO_3$+5 $BaZrO_3$ | 156 | 0.01 | 167 | 1.4 |
| 32 | 100 $CaTiO_3$+10 $BaZrO_3$ | 143 | 0.01 | 160 | 1.3 |
| 33 | 100 $SrTiO_3$+1 $MgZrO_3$ | 267 | 0.01 | 285 | 1.0 |
| 34 | 100 $SrTiO_3$+2 $MgZrO_3$ | 267 | 0.01 | 272 | 1.0 |
| 35 | 75 $CaTiO_3$+25 $MgZrO_3$ | 113 | 0.01 | 123 | 1.4 |
| 36 | 90 $CaTiO_3$+10 $MgZrO_3$ | 137 | 0.01 | 147 | 1.5 |
| 14 | 100 $BaTiO_3$+11 $MgZrO_3$ | 2,800 | 0.69 | 2,500 | 0.45 |
| 2 | 100 $BaTiO_3$+5 $CaZrO_3$ | 1,640 | 1.24 | 1,740 | 2.1 |
| 7 | 100 $BaTiO_3$+9 $SrZrO_3$ | 2,105 | 0.76 | 2,300 | 2.0 |
| 21 | 100 $BaTiO_3$+10 $BaZrO_3$ | 1,360 | 1.04 | 1,500 | 2.3 |

Table 2
*Temperature coefficient of capacity*

| Temp., °C. | Body #24 | Body #25 | Body #27 | Body #29 | Body #31 | Body #32 | Body #36 |
|---|---|---|---|---|---|---|---|
| 30 | 142 | 186 | 306 | 327 | 127 | 146 | 137 |
| 40 | 142 | 185 | 303 | 325 | 127 | 145 | 137 |
| 50 | 141 | 183 | 300 | 322 | 126 | 145 | 136 |
| 60 | 141 | 181 | 296 | 317 | 126 | 144 | 135 |
| 70 | 140 | 179 | 293 | 315 | 125 | 143 | 134 |
| 80 | 139 | 178 | 288 | 309 | 124 | 142 | 133 |
| 90 | 138 | 176 | 283 | 302 | 123 | 142 | 132 |
| 100 | 137 | 173 | 274 | 296 | 122 | 141 | 131 |
| 110 | 136 | 172 | 269 | 286 | 121 | 140 | 130 |
| 120 | 135 | 170 | 264 | 281 | 120 | 138 | 129 |
| 130 | 134 | 166 | 256 | 278 | 119 | 137 | 127 |
| 140 | 133 | 164 | 251 | 274 | 118 | 136 | 126 |
| 150 | 133 | 162 | 247 | 270 | 117 | 135 | 125 |

The temperature coefficients of the compositions listed are indicative of the scope of variation possible. While single compositions may yield the desired coefficient, an infinite variety of coefficient is possible through parallel combination of one or more bodies.

What is claimed is:

1. A dielectric composition substantially consisting of an alkaline earth titanate and an alkaline earth zirconate ceramically combined for regulating the dielectric properties of the titanate.

2. A dielectric composition substantially consisting of an alkaline earth titanate and magnesium zirconate ceramically combined for regulating the dielectric properties of the titanate.

3. A dielectric composition substantially consisting of an alkaline earth titanate and barium zirconate ceramically combined for regulating the dielectric properties of the titanate.

4. A dielectric composition substantially consisting of strontium titanate and an alkaline earth zirconate ceramically combined for regulating the dielectric properties of the titanate.

5. A dielectric composition substantially consisting of calcium titanate and an alkaline earth zirconate ceramically combined for regulating the dielectric properties of the titanate.

6. A dielectric composition substantially consisting of strontium titanate and magnesium zirconate ceramically combined for regulating the dielectric properties of the titanate.

7. A dielectric composition substantially consisting of strontium titanate and barium zirconate ceramically combined for regulating the dielectric properties of the titanate.

EUGENE WAINER.